United States Patent
Berthelat

[15] 3,669,242
[45] June 13, 1972

[54] ROLLER CONVEYOR

[72] Inventor: Robert J. Berthelat, Plessis-Trevise, France

[73] Assignee: Societe Anonyme dite: Etablissements Jacques Berthelat et Fils, Paris, France

[22] Filed: Nov. 13, 1970

[21] Appl. No.: 89,358

[30] Foreign Application Priority Data

Aug. 25, 1970 France.................................7031010

[52] U.S. Cl. ......................................................198/127 R
[51] Int. Cl..........................................................B65g 13/02
[58] Field of Search ...........................198/127, 202, 37, 160

[56] References Cited

UNITED STATES PATENTS 3,285,391  11/1966  Fix......................................148/127 R

FOREIGN PATENTS OR APPLICATIONS 1,543,506  9/1968  France..............................198/127 R Primary Examiner—Richard E. Aegerter
Assistant Examiner—Douglas D. Watts
Attorney—Waters, Roditi, Schwartz & Nissen

[57] ABSTRACT

A conveyor constituted of a plurality of successive series of identical rollers, each series being associated with a laterally extending feeler for controlling rollers adapted to drive rollers of an upper series in the direction of movement of a load. Movement of the rollers is predicated upon actuation of a feeler by a load so as to move the latter in predetermined indexed relationship on the conveyor.

4 Claims, 2 Drawing Figures

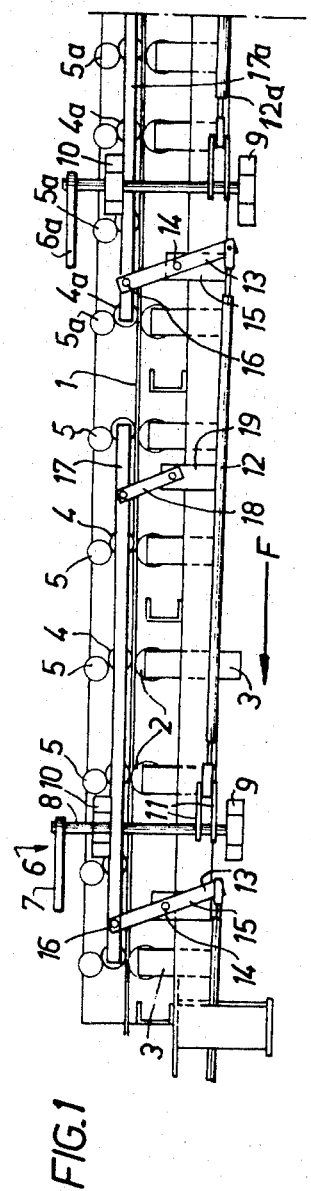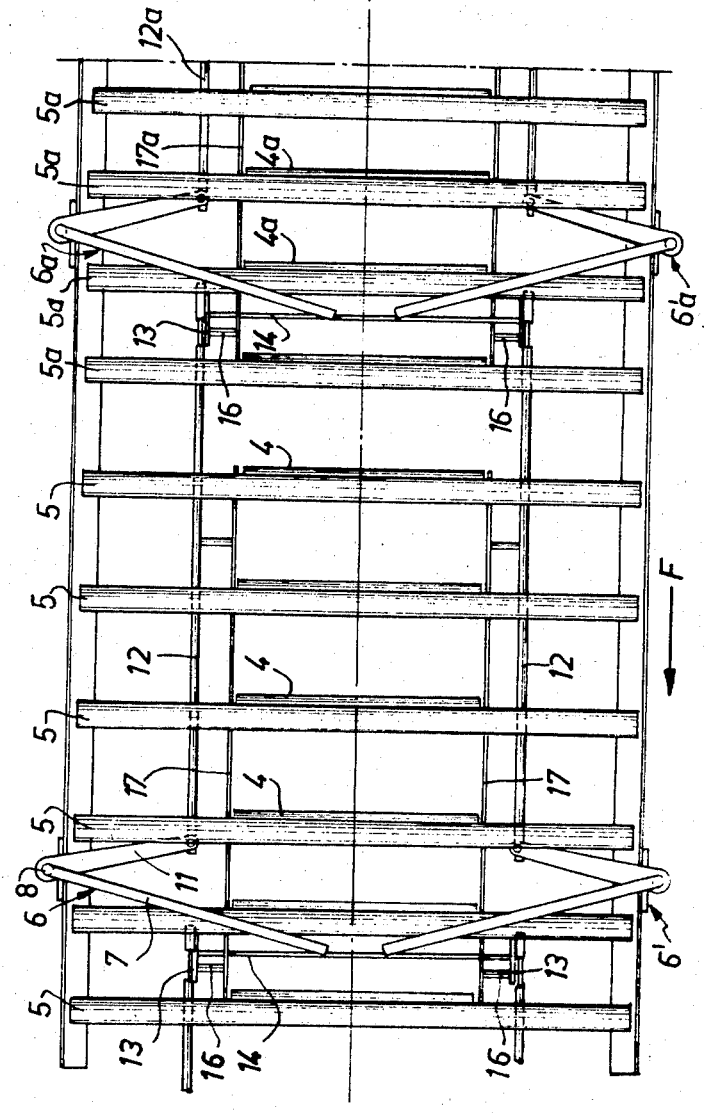
FIG.1
FIG.2

ROLLER CONVEYOR

This invention relates to roller conveyors of the type comprising driving rollers rotated frictionally by secondary rollers which are, in turn, driven frictionally by a continuous driving belt or the like, with a view to immobilizing successively, but not simultaneously, various loads which it conveys, when the movement of the first of such loads is interrupted, for example when it is in contact with an abutment ; the movement of the various loads recommencing sequentially only when the stationary load has restarted its movement or has been removed from the conveyor.

A conveyor of this type is described in the Applicants' French Pat. No. 1,543,506. This conveyor comprises, at regular intervals, rollers elevated relative to the level of the conveyor and mounted to pivot on a fixed framework of the latter, so as to be able to be lowered to the level of the other rollers by the loads conveyed, each elevated roller being connected by a system of rods, to an assembly for driving rollers which are not elevated upstream of the elevated roller which precedes it in the direction of displacement of the loads, so as to disengage the said rollers from the said non-elevated rollers when the corresponding elevated roller is lowered by a load.

Although such a conveyor operates in a very satisfactory manner for the conveyance of loads of average dimensions, it is not so satisfactory in the case of short loads, and loads having support surfaces in poor repair, such as for example, pallets or racks for bottles to be re-used, which is almost always the case, or even in the case of loads which have a rolling surface provided with ribs or which are uneven.

In all these cases, in order that the conveyor may function properly, it would be necessary for the rollers to be virtually contiguous, which is not feasible with the above-mentioned known conveyor.

An object of the present invention is to obviate or mitigate these disadvantages and, in order to do this, there is provided a roller conveyor of the aforesaid type comprising, at regular intervals, pivoting lateral feelers, arranged transversely in relation to the passage of the loads conveyed, in such a way that the latter may displace them, during their travel, from their normal position, the interval which separates two successive feelers being greater dimension of the loads, and each of the said feelers being connected by a system of rods, to the secondary rollers which drive the driving rollers located upstream of the feeler which precedes them in the direction of displacement of the loads, in such a manner as to disengage the said secondary rollers from the said driving rollers and/or from the said drive belt when the corresponding feeler is displaced from its normal position by a load, return means possibly being provided in order to return the said lateral feelers and, consequently, the said rollers or secondary rollers to their initial position as soon as the feelers are no longer pushed back.

The conveyor according to the invention is thus constituted by a plurality of successive series of rollers as in the above-mentioned French Patent Specification. However, in the conveyor according to the present invention, all the rollers are identical. Each series of rollers is associated with a lateral feeler which controls the rollers for driving the rollers of the upper series, in the direction of displacement of the loads.

It is understood that when a load presses on the end of the feeler located in the first series of rollers of the conveyor and remains immobilized in this position abutting against an abutment, the rollers of the following series are no longer rotated. If they support a load, it will thus be immobilized at the moment when it enters into contact with the feeler of this series. At this instant, the rollers of the third series are no longer rotated. By degrees, all the series of rollers will stop rotating. Since the longitudinal dimension of each of the series has been chosen to be greater than the greatest dimension of the loads conveyed, each of the loads becomes immobilized successively, before coming into contact with the preceding load.

Conversely, when a load reassumes its movement or is removed from the conveyor, the lateral feeler against which it was pressing, returns to its initial position urged by the aforesaid return means, similar to the rollers for driving the rollers of the preceding series, which consequently re-start the rotational movement. The load which was resting on these rollers and which kept the feeler of this series displaced from its normal position, also continues its movement and releases the said feeler. The rollers of each of the series consequently re-start their rotational movement in sequence and each of the immobilized loads re-starts its movement only after the load which precedes it on the conveyor.

The result is that the conveyor according to the invention has not only the same advantages as the known conveyor previously described, namely the transportation and the control of the accumulation and of the spacing of the loads, but, moreover, it may serve to convey short loads and loads, whose resting surfaces are in poor condition. In this case, the driving rollers are mounted practically in contact along one of their generatrices and the distance between the feelers will be selected slightly greater than the length of the loads. Thus, the distance separating two feelers may, as a rule, be reduced in order that a single load remains immobilized on each series of rollers, when the first load stops.

It is clear that all the mechanical connection means, for example the system of rods between the feeler and the rollers for driving the rollers, are included in the scope of the claimed invention.

According to one embodiment of the invention, each feeler is constituted by a horizontal lever arranged transversely above the surface of the drive belt in such a manner that its inner end interferes with the region through which the loads pass, the said lever being pivotally mounted on the framework of the conveyor and driving a control rod connected, through the intermediary of a movement reversing device, to a connecting rod supporting the shafts of the secondary rollers which drive the driving rollers in such a way that the said secondary rollers are pushed back when the corresponding feeler is displaced from its normal position and cease to drive the corresponding driving rollers, whether they cease to be in contact with the said rollers in the case where there is no connection means between their respective shafts, or whether they cease to be in contact with the driving belt, in the case where the shafts of the secondary rollers and the corresponding driving rollers are connected for example, by a connecting-rod.

The movement reversing device may be constituted by a connecting-rod pivotally mounted at its center on the framework of the conveyor and pivoted at its ends on the control rod and on the connecting-rod supporting the shafts of the drive rollers.

An embodiment of the present invention will now be described, by way of example, with reference to the accompanying drawing, in which :

FIG. 1 is a diagrammatic side elevation of a conveyor according to the invention ; and FIG. 2 is a plan view of the conveyor of FIG. 1, the continuous belt being assumed to be removed for the sake of clarity.

In the drawing, the continuous belt 1 is rotated in the direction of the arrow F by driving means of conventional type (not shown). The upper part of the belt 1 is supported, at regular intervals, by rollers 2, the spindles of which are supported by support plates 3 integral with the conveyor frame. The continuous belt rotates longitudinally spaced series of secondary rollers 4, 4a with which it is in contact, these rollers 4, 4a in turn driving, by friction, the longitudinally spaced series of drive rollers 5, 5a, etc., the spindles of which are supported by the frame of the conveyor.

The secondary rollers 4, 4a may be replaced by rollers in contact with the ends of the drive rollers 5, 5a. The spindle of each secondary roller 4, 4a may be made integral with the spindle of the associated drive roller 5, 5a by means of a connecting-rod, not shown, as has been described in detail in French Pat. Specification No. 1,543,506. However, the spindles of the secondary rollers 4, 4a may also be independent of the spindles of the corresponding drive rollers 5, 5a, as will be subsequently explained.

In each series of drive rollers 5, 5a, there is mounted a lateral feeler 6, 6a etc., intended to control the displacement towards the rear of the secondary rollers 4, 4a of one series, in such a way as to interrupt the rotation of the drive rollers 5, 5a of the said series. As shown in FIG. 2, lateral feelers 6', 6'a are located on each side of the conveyor, symmetrically in relation to the longitudinal axis of the latter. Due to the symmetry of the conveyor, only one of them, the feeler 6, will be described.

The feeler 6 is formed by a first horizontal lever 7 located transversely and above the continuous belt 1, in such a manner that its inner end extends into the path through which loads pass. The outer end of the lever 7 is rigidly connected to a vertical shaft 8 pivotally mounted inside a bearing 9 and a retaining part 10. In the vicinity of the lower end of the shaft 8 there are rigidly connected two parallel arms 11 at the ends of which is pivoted one end of a longitudinal control rod 12 located under the continuous belt 1. This control rod 12 passes below the rollers of the corresponding series and its movements are independent of these rollers. The other end of the control rod 12 is pivoted to one end of a reversing device 13 pivotally mounted at its center on a transverse shaft 14 supported by support plates 15, the other end of the reversing device 13 being pivoted on a transverse shaft 16 connected to a connecting rod 17 supporting the shafts of the secondary rollers of the series 5a located upstream of the feeler 6.

In the drawing, each connecting rod 17 is connected to six secondary rollers. It is an advantage, due to the weight of the connecting rod 17 and the secondary rollers to which it is connected, to provide a support for the connecting rod 17 at its other end. This support is constituted by a connecting piece 18 pivoted on the connecting rod 17 and on a support plate 19 integral with the framework of the conveyor, in such a manner that the connecting rod 17, the reversing device 13 and the connecting piece 18 form a deformable parallelogram.

When a load abuts against the inner end of the lever 7, the rigid assembly constituted by the lever 7, the shaft 8 and the arms 11 pivot, in the bearing 9, in clockwise direction (cf. FIG. 2). This pivoting takes along, in the direction of the arrow F, the control rod 12, which in turn, rotates the reversing device 13 in clockwise direction. The connecting rod 17a supporting the secondary rollers 4a is thus pushed in the opposite direction to arrow F. If the secondary rollers 4a are connected to the spindles of the drive rollers 5a in a similar way to that described in French Pat. Specification No. 1,543,506, during this movement, they are elevated above the continuous belt 1. Thus, the latter no longer drives the secondary rollers 4a by friction and the drive rollers 5a become immobilized. If, on the contrary, the secondary rollers have no mechanical connection with the drive rollers, during the deformation of the above-mentioned parallelogram, they will remain in contact with the continuous belt but will be separate from the drive rollers such that even in this instance, the latter are immobilized.

It is clear that the same method is repeated step by step when the feelers 6, 6a are displaced from their normal position by the loads conversely, when the feeler 6 is no longer pushed in the direction of the arrow F and returns to its initial position urged by the return means (not shown) or under the simple effect of the weight of the connecting rod 17 and of the secondary rollers, the latter come back into contact with the continuous belt and/or drive rollers.

As has been previously described and as shown in FIG. 2, the feelers may be arranged symmetrically in relation to the longitudinal axis of the conveyor. If the load is well centered on the roller conveyor it acts simultaneously on the two lateral feelers, and if it is badly centered, it acts on only one of them, which does not constitute a disadvantage, since the feelers are synchronized in their movement. For this purpose, the two connecting rods 17 located on either side of the longitudinal axis of the conveyor could, for example, be made integral by the transverse shaft 16.

What we claim is:

1. Roller conveyor of the type comprising drive rollers, secondary rollers, a continuous driving belt or the like and pivotal load feeler means, said drive rollers being frictionally rotated by said secondary rollers which are, in turn, frictionally driven by said continuous driving belt, said pivotal load feeler means being mounted at regular intervals in the path of movement of loads on the conveyor in such a manner that the loads may, during their movement on the conveyor, displace the feelers from their normal position against the action of means adapted to return the feelers to their initial position, the spacing between successive feelers being greater than the greatest dimension of the loads in the conveying direction, movement transmitting means connecting each of the feelers to the secondary rollers which rotate the drive rollers located upstream of the preceding feeler in the direction of displacement of the loads, in such a manner as to disengage the upstream secondary rollers from the associated drive rollers and from the said drive belt, when the feeler is displaced from its normal position by a load, each feeler comprising a horizontal lever mounted for pivoting in a horizontal plane and extending transversally above the surface of the drive rollers so as to have its inner free end normally extend into the path of travel of the loads, said lever being pivotally mounted by its outer end on the framework of the conveyor.

2. A roller conveyor according to claim 1 wherein each feeler is constituted by a horizontal lever located transversely above the surface of the drive belt, in such a way that its inner end extends into the path of travel of the loads, the lever being pivotally mounted on the framework of the conveyor and being connected by control rods through the intermediary of a movement reversing device to a connecting-rod supporting the spindles of a series of secondary rollers driving drive rollers, in such a way that the secondary rollers are pushed back when the corresponding feeler is displaced from its normal position and cease to drive the corresponding drive rollers, whether they cease to be in contact with the drive rollers in the case where there is no means of connection between their respective spindles, or whether they cease to be in contact with the driving belt in the case where the spindles of the secondary rollers and of the corresponding drive rollers are connected.

3. Roller conveyor according to claim 1, wherein said movement transmitting means are constituted of a control rod driven by the feeling lever, a movement reversing device connecting said control rod to a connecting rod supporting the spindles of the secondary rollers which drive the driving rollers, said secondary rollers being pushed back when the corresponding feeling lever is displaced from its normal position, and to discontinue drive of the associated drive rollers.

4. Roller conveyor according to claim 2, the lateral feeling levers being located on each side of the conveyor symmetrically relative to its longitudinal axis, said lateral feeling levers being paired to move together whereby when a load offset from the center line of the conveyor displaces one of the feeling levers from its normal position, the associated feeling lever is concurrently displaced from its normal position.

* * * * *